United States Patent [19]

Yamaguchi

[11] 4,415,057
[45] Nov. 15, 1983

[54] REAR WHEEL DAMPER DEVICE FOR MOTORCYCLE

[75] Inventor: Ken Yamaguchi, Sayama, Japan

[73] Assignee: Honda Giken Kogyo Kabushiki Kaisha, Tokyo, Japan

[21] Appl. No.: 300,036

[22] Filed: Sep. 8, 1981

[30] Foreign Application Priority Data

Sep. 23, 1980 [JP] Japan ................................. 55-132082
Sep. 23, 1980 [JP] Japan ................................. 55-132083
Sep. 23, 1980 [JP] Japan ................................. 55-132085
Sep. 24, 1980 [JP] Japan ................................. 55-132694

[51] Int. Cl.³ ............................................. B62K 25/20
[52] U.S. Cl. .................................... 180/227; 280/284
[58] Field of Search ................. 180/227, 231, 219; 280/284

[56] References Cited

U.S. PATENT DOCUMENTS

| | | | |
|---|---|---|---|
| 3,517,764 | 6/1970 | Wendt | 180/231 X |
| 3,974,892 | 8/1976 | Bolger | 180/227 |
| 4,058,181 | 11/1977 | Buell | 180/227 |
| 4,076,271 | 2/1978 | Doncque | 180/227 |
| 4,139,072 | 2/1979 | Dawson | 180/219 X |
| 4,322,088 | 3/1982 | Miyakoshi | 280/284 |
| 4,360,214 | 11/1982 | Isono | 280/284 |

*Primary Examiner*—John A. Pekar
*Attorney, Agent, or Firm*—Lyon & Lyon

[57] ABSTRACT

A rear wheel suspension device for a motorcycle has a support frame comprising side bars extending from a horizontal bearing cylinder and having a cross member fixed to the side bars to define an opening. An upright damper is pivoted to the main frame and extends through the opening and is pivotally connected to short arms of bell crank members. Long arms of the bell crank members are pivoted to the support frame. Tension rods are pivotally connected to the main frame and to the bell cranks. The long arms each comprise parallel spaced side plates, for weight reduction, and the rear wheel drive chain extends through one of the long arms between said side plates.

11 Claims, 9 Drawing Figures

REAR WHEEL DAMPER DEVICE FOR MOTORCYCLE

This invention relates to rear wheel suspension devices for motorcycles. It is particularly directed to improvements in the construction of the rear wheel support frame and its associated parts in order to improve endurance and to achieve weight reduction with improvement in riding quality.

These objects are achieved by providing a support frame comprising side bars extending from a bearing member horizontally pivoted to the main frame. A cross member is fixed to the side bars to define an opening, and an upright damper extends through the opening and is pivoted at its upper end to the main frame. A pair of bell crank members have short arms pivoted to the lower end of the damper and have long arms which are pivoted to the support frame side bars. Tension rods are pivotally connected to the main frame and to the bell cranks. By this construction the amount of compression of the damper increases at an increasing rate in proportion to upward movement of the rear wheel of the motorcycle.

Other and more detailed objects and advantages will appear hereinafter.

Figure 1:
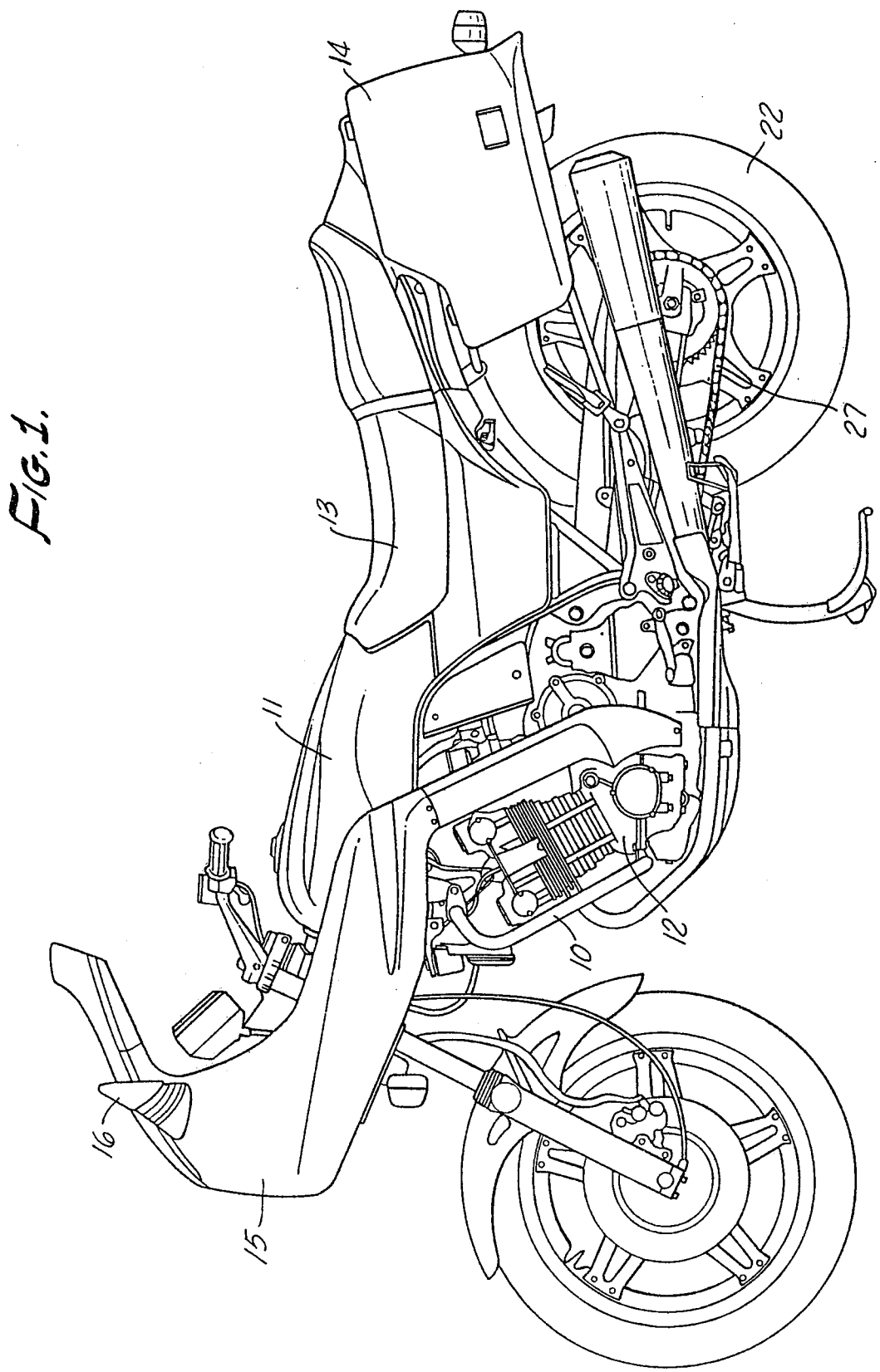
FIG. 1 is a side view of a motorcycle of the type to which this invention pertains.

Referring to the drawings, the motorcycle as shown in FIG. 1 is provided with a main frame 10 supporting a fuel tank 11, an engine 12, and a rider's seat 13. A storage tank 14 is provided below the rear portion of the seat 13, and a fairing 15 for shielding the wind is provided at the front of the motorcycle. The fairing 15 is adapted to cover the face, chest and lower half of the body of the rider, and the fairing is equipped with a side mirror 16.

Figure 2:
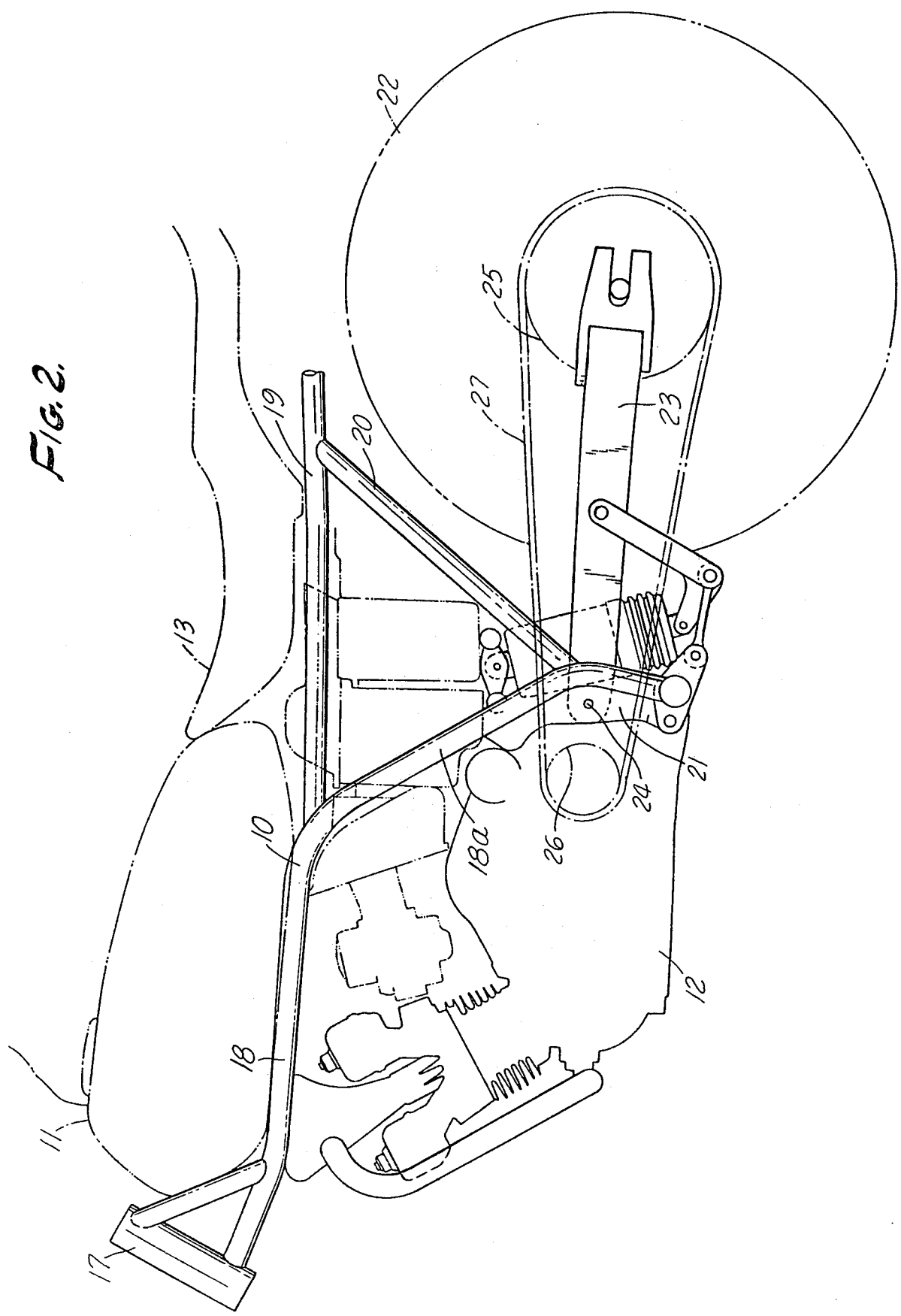
FIG. 2 is a schematic side view showing the main frame of the motorcycle and showing a preferred form of this invention.
Figure 3:
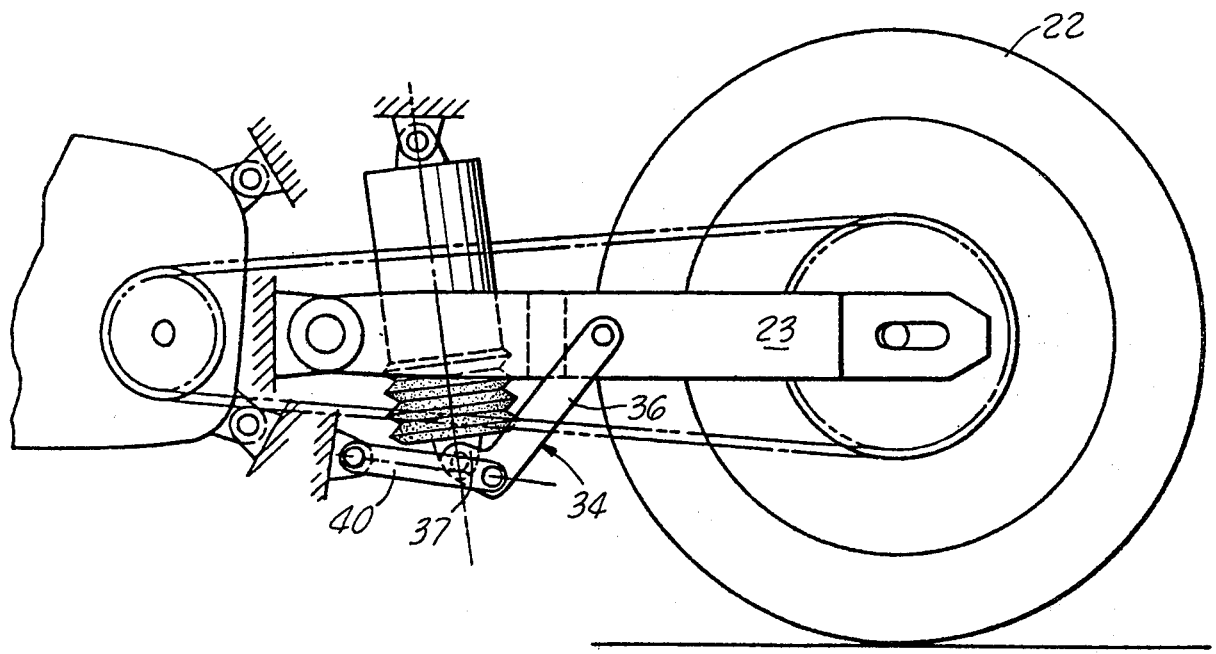
FIG. 3 is a side elevation in diagrammatic form showing the progressive linkage system of this invention.
Figure 4:
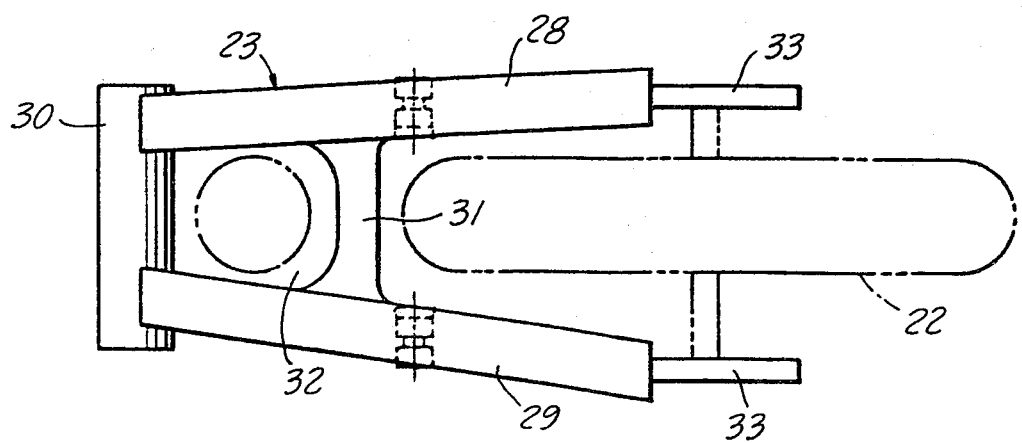
FIG. 4 is a plan view of the device of FIG. 3.

FIG. 2 shows the main motorcycle frame 10 and the various assembled components installed thereon. The frame part 18 extending from the head pipe 17 to the rear is bent midway obliquely downward, with the rear half forming a bent extension 18a. A subframe 20 extending obliquely upward from the bent extension 18a is attached to a seat rail frame 19 extending rearward from the bent portion of the main frame 18, the seat rail frame 19 being supported by the subframe 20. A bracket 21 fixed to the extension 18a for holding the engine 12 is pivotally connected at 24 to a rear wheel support frame 23 mounting the rear wheel 22. A driven sprocket 25 is connected to the rear wheel 22 and is driven by chain 27 from the driving sprocket 26 of the engine 12.

Referring to the diagrammatic illustrations shown in FIGS. 3, 4, 5 and 6, the rear wheel support frame 23 comprises side bars 28 and 29 which diverge from a horizontal bearing cylinder 30. A cross member 31 is fixed to the side bars 28 and 29 and cooperates with them and with the bearing cylinder 30 to define an opening 32 in the frame. The side bars 28 and 29 carry structure 33 at a location remote from the bearing cylinder 30 for mounting the rear wheel 22.

Figure 6:
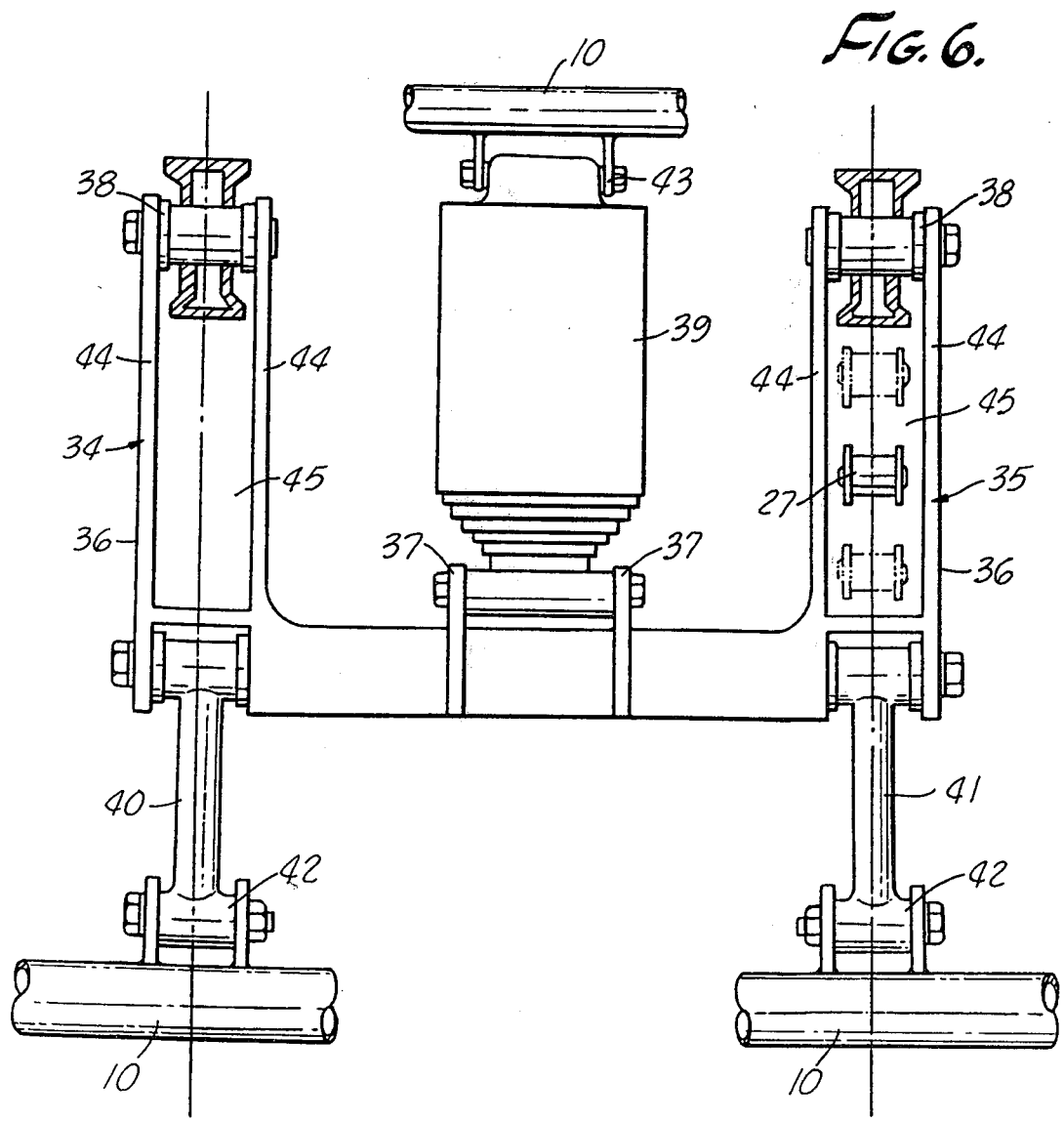
FIG. 6 is a front view partly in section and partly broken away showing the preferred embodiment of this invention.

Progressive linkage for resisting upward movement of the rear wheel 22 with respect to the main frame 10 of the motorcycle includes a rigid link 48 having a horizontal support member 49 and a pair of bell cranks 34 and 35 fixed to the horizontal support member 49 and each having a long arm 36 and a short arm 37. The long arms 36 are pivoted at 38 to the side bars 28, 29 and the short arms 37 are pivoted to the upright damper 39 which extends through the frame opening 32. Tension rods 40 and 41 are pivotally connected to the bell cranks 34 and 35, respectively, at the junction of the long arm and the short arm. These tension rods are also pivotally connected at 42 to the main frame 10. FIG. 6 shows that these tension rods 40 and 41 are in direct alignment with the long arms 36. The damper 39 is pivoted to the main frame 10 at 43.

Figure 7:
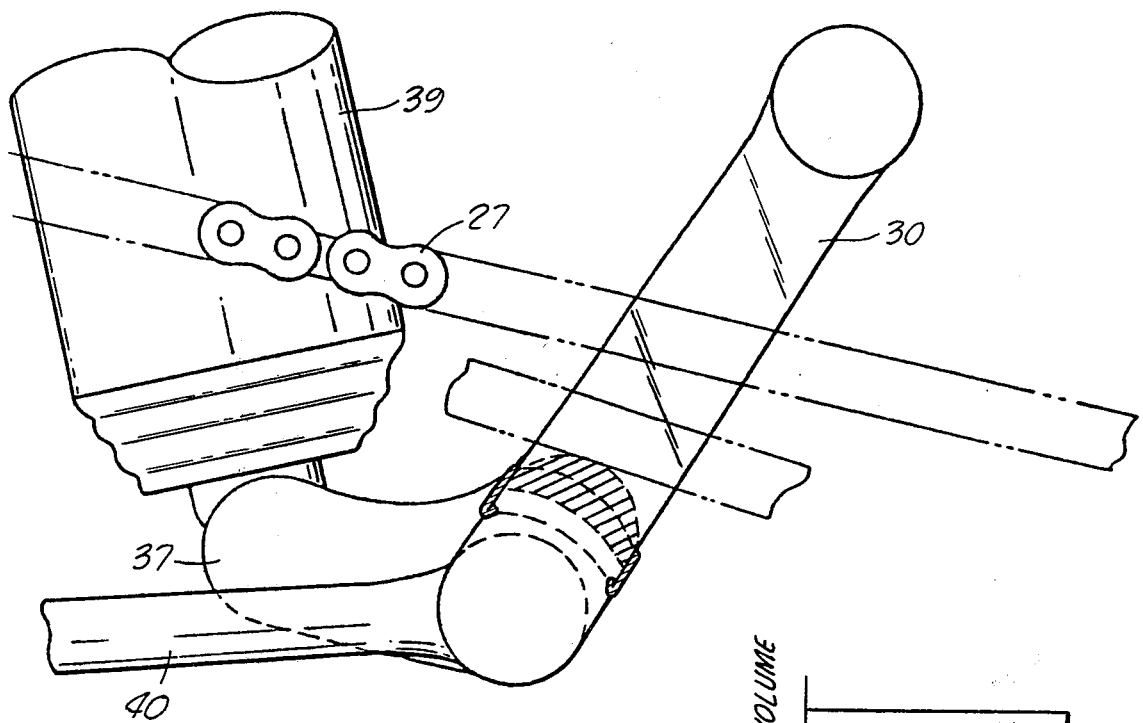
FIG. 7 is an enlarged fragmentary side view showing deflection of the drive chain.
Figure 9:
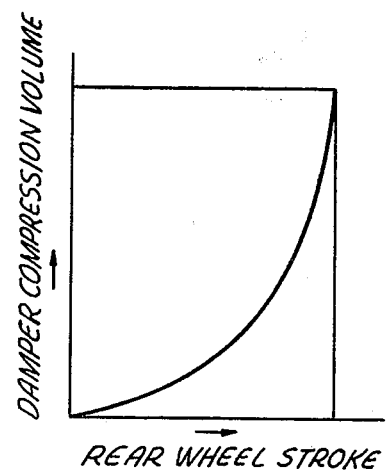
FIG. 9 is a schematic diagram showing the relation between the rear wheel stroke and the extent of damper compression.
Figure 8:
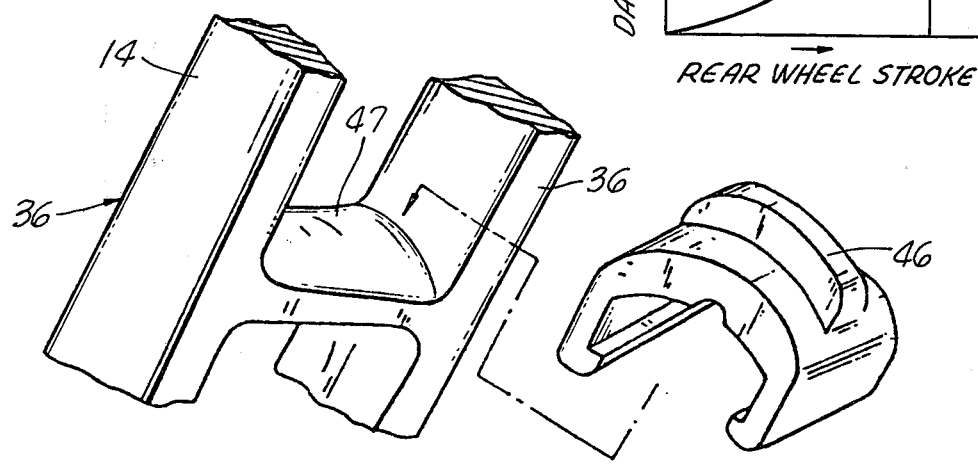
FIG. 8 is an oblique view partly broken away, showing the chain slider for use on the bridge portion of the long arm of one of the bell crank members.

For stiffness and strength and minimum weight, the long arms 36 are each formed of laterally spaced side plates 44 having a hollow space 45 between them. The chain 27 extends through the hollow space 45 in one of the long arms 36. As shown in FIGS. 7 and 8, a chain slider 46 made of non-metallic material such as nylon is mounted on a bridge portion 47 connecting the side plates 44 below the position of the chain 27. The slider 46 prevents the lower stretch of the chain 27 from contacting the bridge portion 47, when that portion of the chain is deflected from its normal path.

Figure 5:
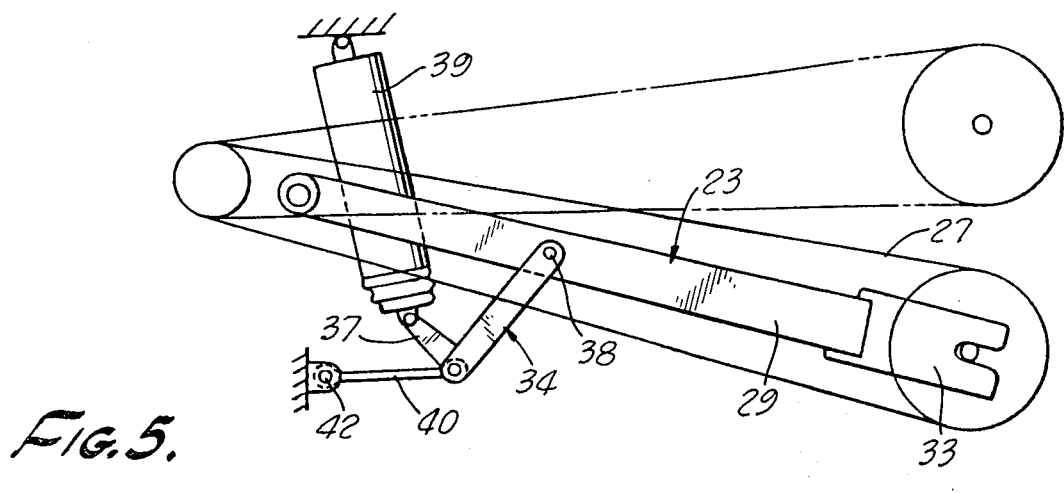
FIG. 5 is a view similar to FIG. 3 showing movement of the rear wheel support frame.

In operation, when an upward force is applied to the rear wheel 22, the rear wheel support frame swings upward with the bearing cylinder 30 acting as a fulcrum. The bell cranks 34 and 35 move upward against the action of the tension rods 40 and 41 so that the damper 39 is compressed. If the angle between the tension rod 40 and the damper 39 is set to be an acute angle at low loads and is arranged so that it approaches a right angle with the increase of the load, the amount of compression of the damper 39 can increase with upward movement of the rear wheel support frame 23. As a result, as shown in the diagram of FIG. 5, a desirable shock absorbing characteristic from the viewpoint of riding comfort is achieved, in that the amount of compression increases at an accelerating fashion in proportion to upward movement of the rear wheel support frame 23.

The tension rods 40 and 41 are not required to carry bending stresses, but only simple tension forces. Accordingly, each tension rod can be formed smaller in diameter and yet have sufficient endurance, which results in a reduction of the unsprung weight for improved riding quality.

The location of the progressive link mechanism below the rear wheel support frame 23 makes it possible to lower the height position of the damper 39 and thereby provide space for the air cleaner, battery and other assemblies above the damper, which is convenient from the standpoint of placement of the assemblies.

Furthermore, it is advantageous in that the seat height can be set at a desirable height level for motorcycles for on-road use.

Having fully described by invention, it is to be understood that I am not to be limited to the details herein set forth but that my invention is of the full scope of the appended claims.

I claim:

1. In a rear wheel suspension device for a motorcycle having a main frame, the combination of
   a rear wheel support frame having side bars and a cross member extending between said side bars;
   a horizontal bearing member pivotally mounting said support frame to the main frame;
   an upright damper pivotally mounted to the main frame at its upper end and extending between said side bars and between said cross member and said horizontal bearing member, the lower end of said upright damper being below said support frame;
   a rigid link having two long arms each of which is pivotally mounted at one end to a said side bar intermediate the ends of the said side bar and extending downwardly therefrom;
   a horizontal support member extending between said long arms of said rigid link at a distance from said one end of said long arms and pivotally supporting the lower end of said upright damper; and
   tension rod means for connecting, at spaced pivot points, the main frame and said rigid link, below said support frame and at a distance from said one end of said long arms.

2. In a rear wheel suspension device for a motorcycle having a main frame, the combination of
   a rear wheel support frame having side bars and a cross member extending between said side bars;
   a horizontal bearing member pivotally mounting said support frame to the main frame;
   an upright damper pivotally mounted to the main frame at its upper end and extending between said side bars and between said cross member and said horizontal bearing member, the lower end of said upright damper being below said support frame;
   a rigid link having two long arms each of which is pivotally mounted at one end to a said side bar intermediate the ends of the said side bar and extending downwardly therefrom;
   tension rod means for connecting, at spaced pivot points, the main frame and said rigid link, below said support frame and at a distance from said one end of said long arm; and
   a horizontal support member being located between said long arms of said rigid link, the lower end of said upright damper being pivotally mounted to said horizontal support member offset from the pivotal connection between said rod means and said rigid link.

3. In a rear wheel suspension device for a motorcycle having a main frame, the combination of
   a rear wheel support frame having two side bars and a cross member extending between said side bars;
   a horizontally bearing member pivotally mounting said support frame to the main frame;
   an upright damper pivotally mounted to the main frame at its upper end and extending between said side bars and between said cross member and said horizontal bearing member, the lower end of said damper being below said side bars;
   a rigid link having two long arms each of which is pivotally mounted at one end to a said side bar intermediate the ends of the said side bar and extending downwardly therefrom;
   a horizontal support member extending between said long arms of said rigid link at a distance from said one end of said long arms, the lower end of said upright damper being pivotally mounted to said horizontal support member at a distance from the said one end of each said long arm; and
   two tension rods each being pivotally connected to the main frame and to said rigid link at a distance from said one end of each said long arm, said tension rods being spaced apart to either side of said rigid link.

4. The combination set forth in claim 3 wherein said horizontal support member is rigidly fixed between said long arms to said rigid link.

5. The combination set forth in claim 4 wherein the lower end of said upright damper is pivotally mounted to said horizontal support member, offset from the pivotal connection between the main frame and each said tension rod.

6. The combination set forth in claim 3 in which said long arms each comprise a pair of laterally spaced side plates extending to either side of a said side bar at said one end.

7. The combination as set forth in claim 3 in which at least one of said long arms includes a passageway therethrough for a rear wheel drive chain.

8. The combination set forth in claim 3 wherein said horizontal support member includes two short arms rigidly fixed thereto, said cushion member being pivotally mounted to one end of said short arms.

9. In a rear wheel suspension device for a motorcycle having a main frame, the combination of
   a rear wheel support frame having side bars and a cross member extending between said side bars;
   a horizontal bearing member pivotally mounting said support frame to the main frame;
   an upright damper pivoted to the main frame at its upper end and extending between said side bars and between said cross member and said horizontal bearing member, the lower end of said upright damper being below said side bars;
   a rigid link having a horizontal support member and a pair of parallel bell crank members, each bell crank member having a long arm and a short arm, one end of each said long arm being pivotally mounted to a said side bar and one end of each said short arm being pivotally mounted to the lower end of said upright damper; and
   two tension rods being pivotally connected to said rigid links at a distance from said one end of said long arms and at a distance from said one end of said short arms and pivotally mounted to the main frame, said tension rods being spaced apart on either end of said horizontal support member.

10. The combination set forth in claim 9 in which said long arms each comprise a pair of laterally spaced side plates extending to either side of a said side bar at said one end.

11. The combination set forth in claim 9 in which at least one of said long arms includes a passageway therethrough for a rear wheel drive chain.

* * * * *